May 5, 1959
JOHN P. FELLABAUM
NOW BY CHANGE OF NAME
JOHN PHIL FELBURN
SHOCK-ABSORBING VEHICLE SUSPENSION
2,885,217
Filed Sept. 21, 1953
4 Sheets-Sheet 1
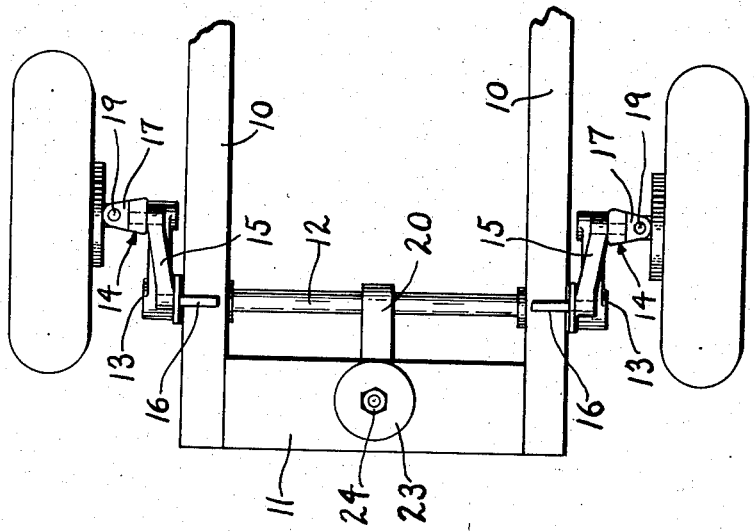
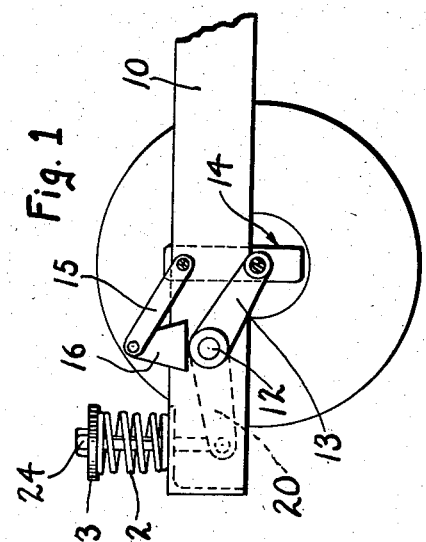
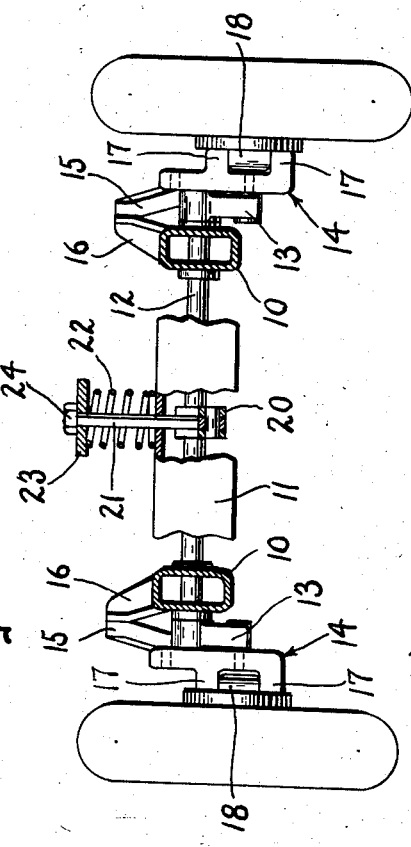
INVENTOR
John P. Fellabaum
Now by change of name, John Phil Felburn
BY
Michael Williams
Attorney May 5, 1959
JOHN P. FELLABAUM
NOW BY CHANGE OF NAME
JOHN PHIL FELBURN
SHOCK-ABSORBING VEHICLE SUSPENSION
2,885,217
Filed Sept. 21, 1953
4 Sheets-Sheet 2
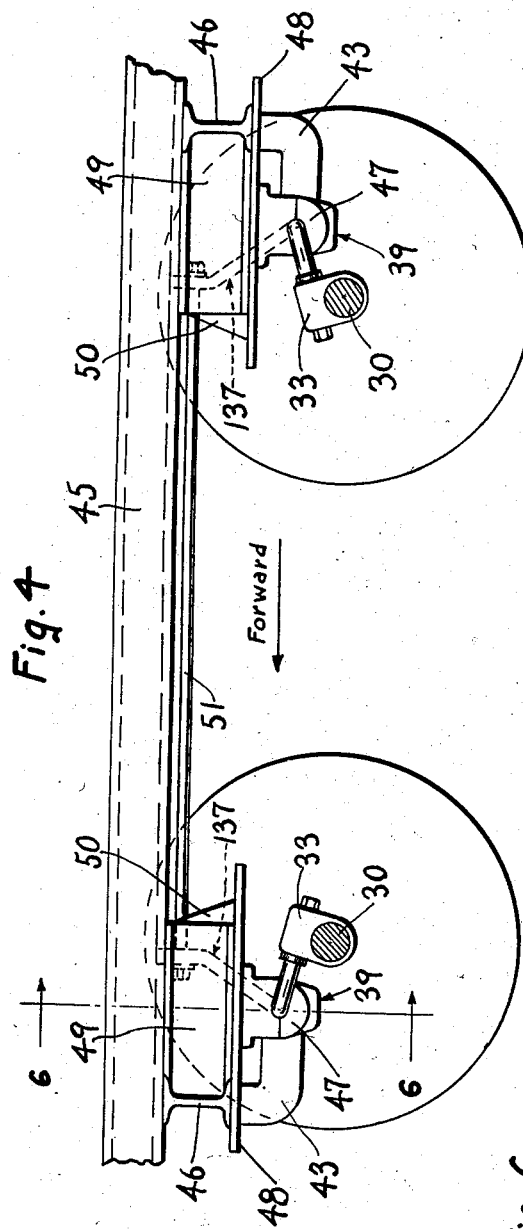
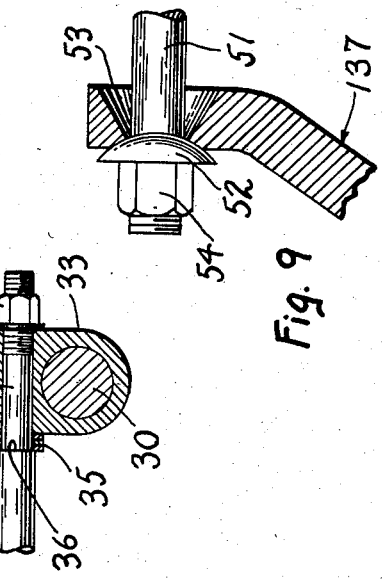
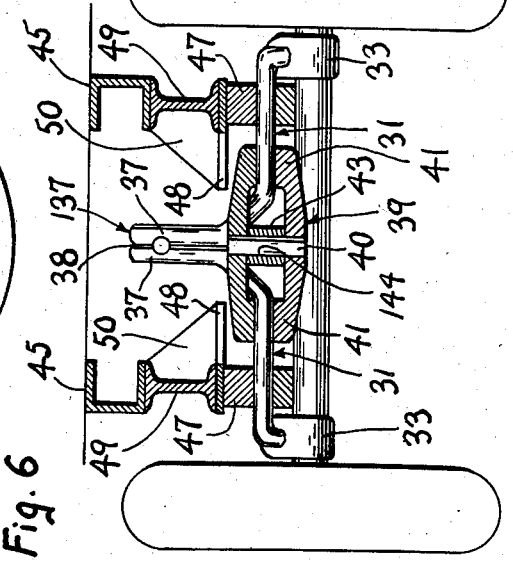
INVENTOR
John P. Fellabaum
Now by change of name, John Phil Felburn
BY
Michael Williams
Attorney

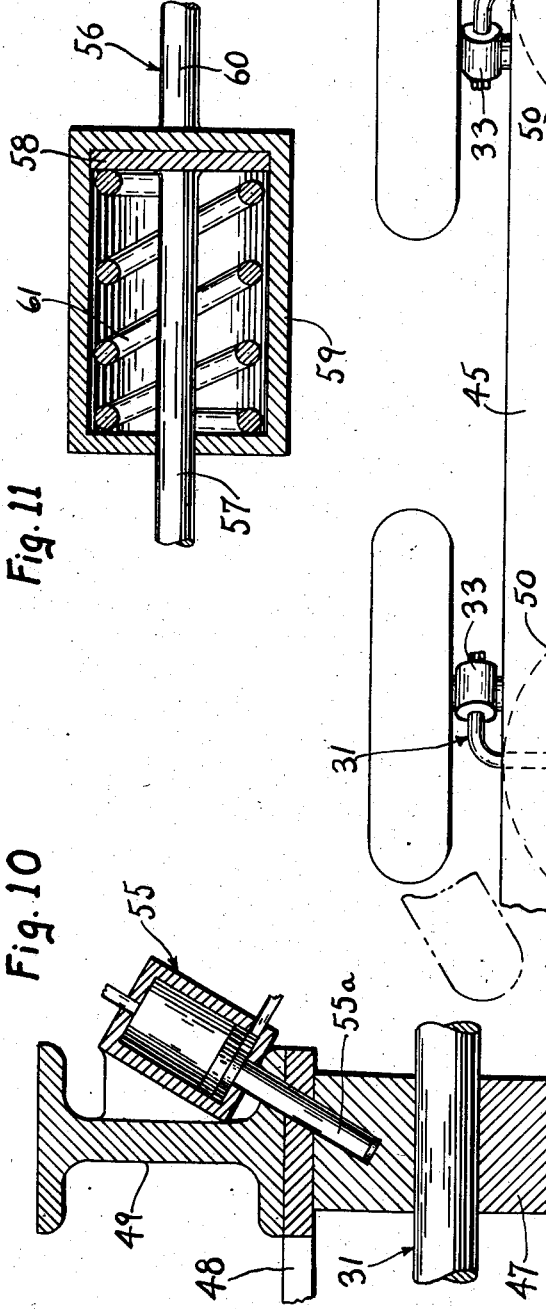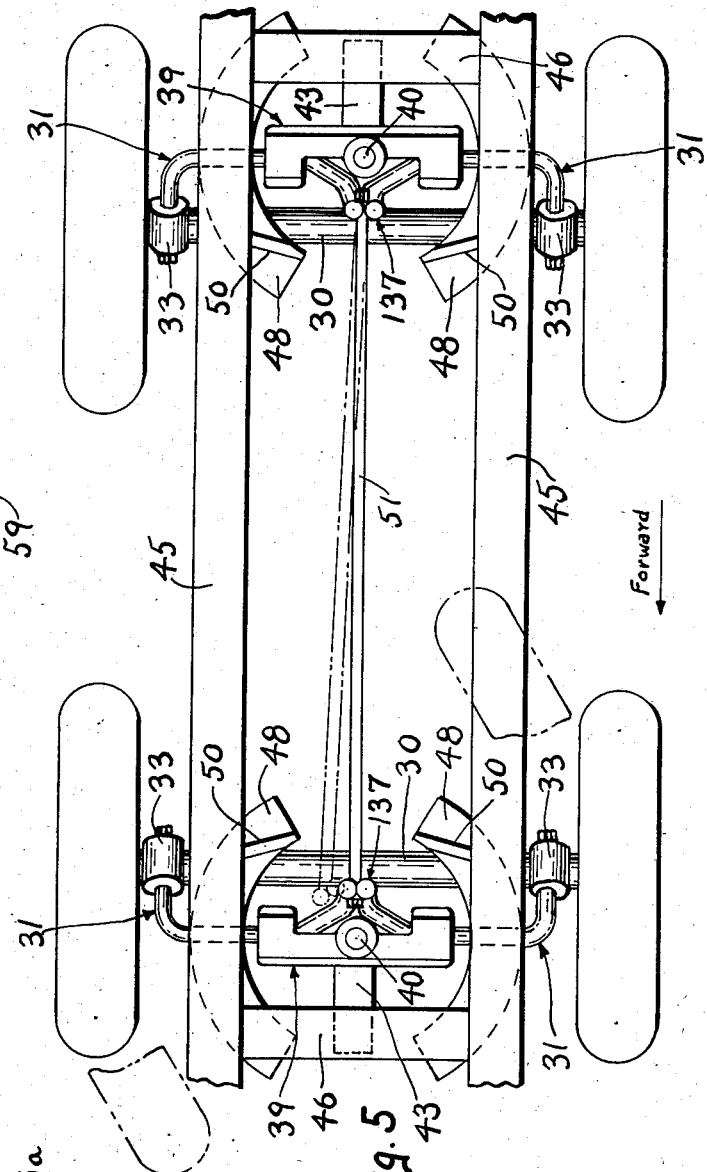

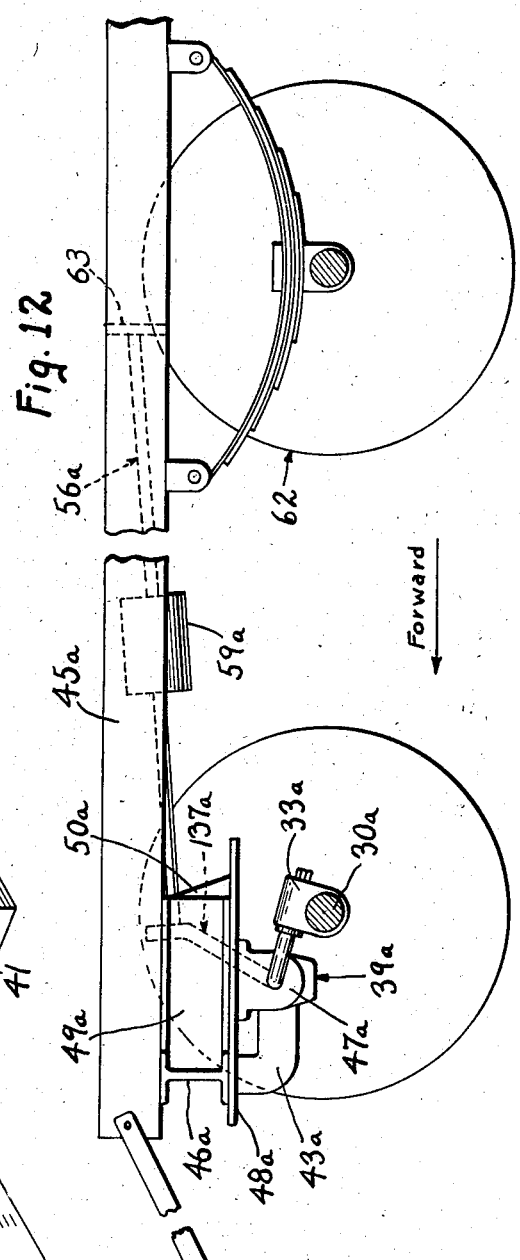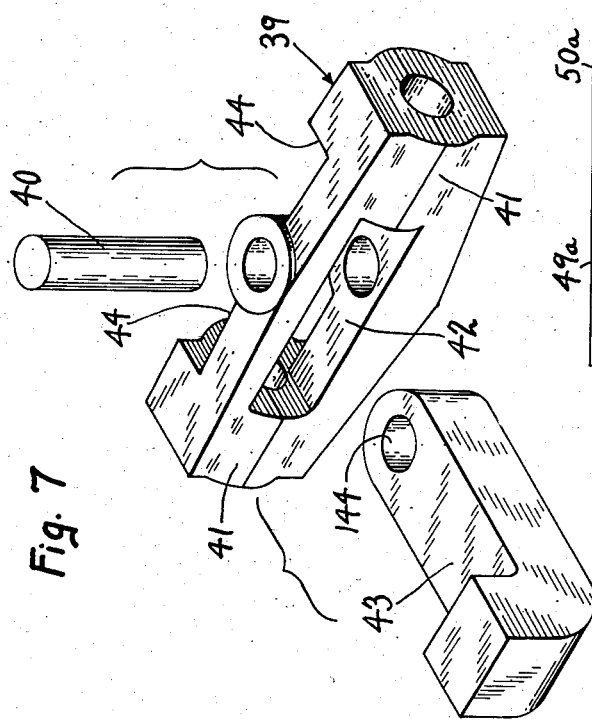

United States Patent Office 2,885,217
Patented May 5, 1959

1

2,885,217

SHOCK-ABSORBING VEHICLE SUSPENSION

John P. Fellabaum, Warren, Ohio, now by change of name John Phil Felburn

Application September 21, 1953, Serial No. 381,265

9 Claims. (Cl. 280—86)

The present invention relates to shock absorbing suspensions for vehicles and the principal object of my invention is to provide new and improved suspensions of the character described.

Although many inventions have been made in improving shock absorbing suspensions for vehicles, few have achieved any degree of success in solving the many problems which exist in this field. It must be kept in mind that an ideal suspension should absorb road shock without transmitting it to the vehicle, while at the same time, such suspension should prevent undesirable movement such as the body sway that occurs when a vehicle turns a corner.

Heretofore, suspensions have been designed which would absorb road shock quite satisfactorily; however, most of these suspensions employ a separate spring to support respective opposed wheels and this results in undesirable body lean on turns. As a vehicle employing these prior art suspensions turns a corner, centrifugal force shifts the vehicle's center of gravity toward the outside of the turn and increases the load carried by the outside spring. At the same time, the weight shift decreases the load carried by the inside spring. Accordingly, since the springs on opposite sides of the vehicle are unevenly loaded, the body of the vehicle will lean to the outside of the turn.

My invention provides a suspension that substantially eliminates body sway without resorting to stiff, hard-riding springs. Furthermore, my invention is adapted for use with multi-axled trailers and the like. These and other advantages will become apparent from a study of the following description and from the drawings appended hereto.

In the drawings accompanying this specification and forming a part of this application there are shown, for purpose of illustration, several embodiments which my invention may assume, and in these drawings:

Figure 1 is a fragmentary, side elevational view of my invention applied to the front wheels of an automotive vehicle, certain parts on the near side being removed in the interest of clarity, Figure 2 is a top plan view of the embodiment illustrated in Figure 1, Figure 3 is a front elevational view of the construction shown in Figures 1 and 2, certain parts being broken away to illustrate interior construction, Figure 4 is a fragmentary, side elevational view of my invention applied to a multi-axled semi-trailer, the wheels on the near side being removed in the interest of clarity, Figure 5 is a top plan view of the embodiment illustrated in Figure 4, Figure 6 is a sectional view generally corresponding to the line 6—6 of Figure 4, Figure 7 is an enlarged, exploded perspective view of certain details, Figures 8, 9 and 10 are enlarged, fragmentary views of details shown partially in section,

2

Figure 11 is an enlarged, fragmentary sectional view of a detail, and

Figure 12 is a view similar to Figure 4 but of a modified construction for application to a full trailer.

In Figures 1, 2 and 3, my invention is shown applied to the front, steerable wheels of a land vehicle, such as an automobile. It is to be understood, however, that the construction about to be described may also be adapted to the rear wheels of such a land vehicle if desired.

While the vehicle illustrated comprises a conventional frame structure formed of a pair of longitudinally extending frame members 10, 10 connected together by a cross-member 11, it is to be understood that I intend to include any type of wheeled vehicle, regardless of frame and/or body construction. Accordingly, the term frame is therefore to be considered a generic term which refers to any suitable load-bearing structural portion of the vehicle. Furthermore, although only one cross-member has been shown, it will be understood that as many as necessary may be employed and each may take any suitable form.

A shaft 12 extends transversely of the frame members 10, 10 and is pivotally supported by each of the members 10 in any suitable manner. In the present embodiment, the shaft 12 extends beyond the members 10 and links 13 are fixedly secured to respective ends of the shaft 12 adjacent respective frame members 10. Each link 13 extends downwardly and rearwardly from the shaft 12 and each has its free end pivotally secured to a support member 14.

Another link 15 is disposed in spaced-apart, parallel relation with respect to each of the links 13, and each link 15 has one end pivotally secured to a respective support 14 and the other end pivotally secured to a bracket 16 welded or otherwise secured to a respective frame member 10. It will be appreciated that the links 13, 15 are the same length to provide a parallel linkage arrangement for a purpose to be disclosed.

As best shown in Figure 3, each support member 14 is adapted to support a wheel for pivotal movement to provide for steering. Accordingly, each support 14 is provided with furcations 17 for receiving therebetween a member 18 which is integral with or secured to a conventional spindle (not shown) about which a respective wheel revolves. A king pin 19 (see Figure 2) pivotally secures each member 18 between the furcations 17 of the respective supports 14. Although not shown in the drawings, a conventional mechanism will be connected to the wheels in any suitable manner to provide for steering.

Means are provided for resisting rotation of the shaft 12 under the load imposed by the weight of the vehicle, and in the present embodiment, an arm 20 has one end thereof fixedly secured to an intermediate portion of the shaft 12, as shown, by any suitable means. The free end of the arm 20 is bifurcated to pivotally receive one end of a rod 21 which extends upwardly from the arm 20 and through an aperture in the cross-member 11.

In the present embodiment, a coil spring 22 encircles the rod 21 and is seated on the upper surface of the cross-member 11. A head 23 is apertured to pass the rod 21 and rests upon the spring 22, the head, spring and rod being held in assembled relation by means of a nut 24 threaded upon the rod. As will be understood, the weight of the vehicle is yieldably supported by the spring 22, and the nut 24 provides for adjustment of the height of the vehicle above the road surface.

At the present time, it is preferable that the shaft 12 be so constructed that it will have a certain amount of torsional deflection under load to provide for limited independent springing movement of the wheels. However, the torsional rigidity of the shaft 12 is preferably of such amount so that the major portion of the springing movement of the wheels will be cushioned by the spring 22.

Since the spring 22 provides equal support for each of the wheels there will be no tendency for the vehicle to lean as it turns a corner at high speed. This will be true regardless of the springing characteristics of the spring 22. Accordingly, spring 22 may be proportioned to provide a softly cushioned ride without detracting from the roadability of the vehicle.

By reason of the fact that the links 13, 15 are parallel and because of their trailing arrangements, predetermined wheel settings of caster and camber will be maintained regardless of wheel movement due to road irregularities, thereby greatly reducing tire wear. Although not shown in the drawings, suitable shock absorbers may be employed to dampen wheel movement.

As illustrated in Figures 4, 5, 6 and 11, my invention is applicable to trailers and the like having spaced-apart tandem wheels. It has long been known that heavier loads may be carried by a trailer and road damage lessened if the supporting tandem wheels are spaced apart a considerable distance. However, when the tandem wheels are so spaced apart, serious tire wear occurs unless some means is provided for steering at least one of the sets of the wheels.

In the embodiment illustrated in Figures 4, 5 and 6, I have shown a semi-trailer having widely spaced, tandem wheels each set of which is mounted for castering movement. It is to be understood, however, that the castering mounting of either one of the sets of wheels may be eliminated if desired. In the event tire wear is of secondary importance, the castering mounting of both sets of wheels may be eliminated. Furthermore, while I have shown the sets of tandem wheels connected together for equalizing action, I may resiliently connect one or both of the sets of wheels to the frame of the vehicle in manner similar to that shown in Figures 1, 2 and 3 so that the action of each set would be independent of the other (see Figure 12).

In the embodiment illustrated in Figures 4, 5 and 6, each of the sets of wheels comprises a pair of wheels rotatably supported in axially spaced-apart relation by means of an axle 30. Each axle 30 is supported for movement transversely of its axis toward and away from the trailer by means of a generally U-shaped shaft 31. The terminal portions 32 of the legs of each of the shafts 31 are reduced in diameter, as shown in Figure 8, and each portion 32 extends through respective members 33 secured, in fixed position, by any suitable means to the axles 30. A nut 34 is threaded upon each of the portions 32 to hold the members 33 in assembled relation with respective leg portions, washers 35 being interposed between each member 33 and the shoulder 36 provided on each leg portion to permit adjustments to be made in axle alignment simply by removing or adding washers.

In the present embodiment, each shaft 31 is formed of two members bent to provide generally upright portions 37 which are welded or otherwise secured together at 38 to form a unitary generally upright arm 137. Each shaft 31 is adapted to be pivotally supported for movement about its longitudinal axis and also pivotally supported for movement about a substantially vertical axis, with reference to the position of parts shown in Figures 4 and 6.

To effect the aforementioned movement of the shaft 31, it is presently preferred to provide a yoke-like member 39 which is pivotable about a pin 40 and which has portions 41 pivotally supporting spaced-apart portions of respective shafts 31 (see Figures 6 and 7). Each member 39 has an opening 42 formed therein to receive a support 43 and is notched out at 44 to provide operating clearance for the portions 37, 37 of respective shafts 31. As illustrated, each member 39 is formed of two pieces secured together by bolts (not shown) or other suitable means to facilitate assembly.

Each support 43 in the present embodiment is generally L-shaped, the longer leg of the L being apertured at 144 to pass the pin 40 and the shorter leg of the L being secured to the conventional spaced-apart, longitudinally extending frame members 45, 45 of the trailer by any suitable means. In the present embodiment, I beams 46 are welded across the frame members 45, 45 as shown, and the terminal end of the shorter leg of the L of each support is welded to the under surface of the respective beams.

Means are provided for supporting each of the shafts 31 at points adjacent respective legs thereof and such means presently comprises a pair of shoes 47 for each shaft, each shoe of such pair providing a journal for a respective shaft leg and each shoe being slideably engageable with a respective one of a pair of arcuate plates 48 which are concentrically positioned about respective pivot pins 40. Each plate 48 is spaced below the frame members 45 and fixedly secured in position by welding or the like to I beams 49 which in turn are welded or otherwise secured to respective frame members 45. As illustrated, one end of each of the respective pairs of plates 48 underlies and is welded or otherwise secured to respective beams 46, and the other ends of the plates are braced by means of gusset plates 40 which extend between a plate and a respective beam 49 and are welded in position as shown.

In the present embodiment, no provision has been made to hold the shoes 47 in engagement with respective plates 48 since the weight of the trailer will effectively hold these parts together. However, if desired, any suitable means may be employed to hold each shoe and its respective plate against separation.

As a result of the foregoing construction, each set of wheels is mounted for movement about a generally horizontal axis by means of the journals provided for respective shafts 31 by the yokes 39 and shoes 47 for each set of wheels. Each shaft 31 may also pivot about a generally vertical axis by reason of the fact that the pin 40 is supported in generally upright position by the support 43, and the yoke 39 carrying the shaft 31 is rotatable about the pin. During pivoting movement about the pin, 40, the shoes 47 will be engagement with and slide along the plates 48 and support the ends of a respective shaft against deflection.

In the embodiment illustrated in Figures 4, 5, and 6 the respective sets of wheels are connected together for equalizing action and for this purpose it is preferred to connect a pull rod 51 between the arms 137 of the spaced shafts 31. In the case where the arms 137 are formed by welding together the upright portions 37 of the two members comprising the shaft 31, sufficient weld metal may be deposited to provide an area which may be bored to pass the rod, as shown in Figure 9. The bore may comprise a generally semi-spherical seat at one side of the arm 137 and a conical enlargement 53 at the opposite side, the semi-spherical seat receiving a complementary semi-spherical washer 52 and the conical enlargement providing clearance for swinging movement of the rod about the seat. A nut 54 is preferably threaded upon each extremity of the rod to hold each semi-spherical washer 52 in proper working engagement with its seat. Since the semi-spherical seats in the spaced pair of arms 137 are in opposed relation, the nuts 54 will hold the rod 51 in assembled relation with the arms 137. The threads at each end of the rod 51 may be of sufficient length so that the nuts 54 may have adjustment movement therealong, such movement providing for lengthening or shortening of the effective length of the rod 51 so that the spaced arms 137 may be inclined toward or away from each other a predetermined amount. Any adjustment of the arms 137 toward or away from each other will result in a corresponding shifting of a respective shaft 31 in the horizontal bearings provided by the yoke 39 and the shoes 47 whereby the angular ends of the shaft 31 will also shift correspondingly and thus shift the axle 30 carrying the wheels. Accordingly, adjustment of the nuts 54 relative to the rod 51 may be used to adjust the height of the trailer above the road surface. It will be appreciated that the connection between the arms 137 and opposite ends of the rod or link 51 is of the one-way force transmitting type (see Figure 9) and is so arranged to transmit a pulling force only from one arm 137 to the rod or link 51, and from the rod or link to the other arm 137.

In the presently disclosed embodiment, it is preferable to selectively lock one or the other of the sets of wheels against pivotal movement about respective pins 40 depending upon the direction of movement of the trailer. This is necessary since the semi-trailer would not track properly if both sets of wheels were permitted to caster simultaneously. In the event the trailer is being drawn in the direction of the arrow shown in Figure 4, the right-hand set of wheels will be locked against movement about a respective pin 40 while the left-hand set of wheels will remain free to caster about its pin 40. On the other hand, movement of the trailer in the opposite direction will require that the left-hand set of wheels be locked and the right-hand set of wheels unlocked in order to provide for easy maneuverability.

Any suitable means may be employed for locking the sets of wheels as described above. For example, and as shown in Figure 10, a fluid operated cylinder 55 may be secured to one of the I beams 49 adjacent each of the sets of wheels. The cylinder will have a piston rod 55a extending therefrom and adapted to pass through aligned apertures in the beam 49 and the plate 48 and into an aperture in the adjacent shoe 47.

In the position of parts shown in Figure 10, shaft 31 is locked in straight ahead position and against rotation about the pin 40 since piston rod 55a is seated within the aperture in shoe 47. When it is desired to permit rotation of shaft 31 about pivot pin 40, fluid pressure will be employed to shift the rod 55a so that it withdraws from the shoe 47 to thus permit the shoe to slide relative to the plate 48. When it is desired to once again lock shaft 31, the shaft will first be positioned in substantially straight-ahead position and the piston rod 55a once again shifted by fluid pressure to return it to the position shown in Figure 10.

Assuming that the trailer is moving in the direction of the arrow shown in Figure 4 and that the right-hand set of wheels is locked and that the left-hand set of wheels is unlocked in the manner described above, operation will be as follows:

When a bump is encountered by the left-hand set of wheels, the impact will cause the wheels to move upwardly, thereby rotating the left-hand shaft 31 in a counter-clockwise direction, and causing the left hand arm 137 to move to the left. This will effect a pull on the right-hand arm 137 in the same direction, thus rotating the right-hand shaft 31 and moving the right-hand set of wheels downwardly, relative to the trailer. This will effect equalizing action between the sets of wheels so that each will bear its share of the load regardless of road irregularities. As will be clear, the opposite reaction will occur when the right-hand set of wheels strikes a bump.

In the presently disclosed embodiment, it is preferable to permit each shaft 31 to have a limited amount of torsional deflection under load so as to cushion road impacts and to provide for limited independent movement between the opposed wheels of each pair of wheels. However, and as was pointed out with respect to Figures 1, 2 and 3, such deflection will be limited to prevent excessive body sway.

In turning, action of the embodiment illustrated in Figures 4, 5 and 6 will be as follows: As the trailer is drawn in the direction of the arrow and around a corner, a side thrust will be set up against the left-hand set of wheels so as to cause them to swing or caster about the pivot 40. Since the free end of the arm 137 is off-set with respect to the pivot 40, castering action of the wheels will swing the arm in an arc about the pivot and in a direction away from the arm 137 of the right-hand set of wheels. However, since the rod 51 ties the arms 137, 137 together, movement of the left-hand arm will exert a pull on the right-hand arm, through the rod 51, which will be displaced from normal straight-away position to a slightly diagonal position as shown in dotted lines in Figure 5. To accommodate the rod 51 in its diagonal position, both arms 137 will be subjected to a force tending to swing their respective shafts 31 about the horizontal bearings provided by the yoke 39 and shoes 47 and in a direction to urge the axle 30 downwardly toward the road surface. Since the road surface is unyielding, the net result will be that the entire body of the trailer and the load carried thereby will be raised a corresponding amount and such weight tends to urge and maintain the left-hand set of wheels in straight-away position, assuming that the right-hand set of wheels is held in straight-ahead position by the locking device. Therefore, the moveable set of wheels will be automatically returned to a straight-ahead position immediately upon completion of a turn and when there is no longer any castering force applied to the wheels, and the weight on the wheels will thereupon stabilize the movable set of wheels in straight-ahead position regardless of road surface irregularities.

Figure 11 fragmentarily illustrates a rod 56 which is similar in function to rod 51 and which may replace the latter if desired. As illustrated, rod 56 is formed in two sections for a purpose to be disclosed. The left-hand section 57 of the rod 56 is secured to a head 58 that is slideable within a cylinder 59 secured to the right-hand section 60 of the rod 56. A spring 61 is interposed between the head 58 and the cylinder 59, as shown, to yieldably urge the sections 57, 60 together.

When rod 56 is used in place of rod 51, it will be evident that forces will be transmitted from one end of the rod to the other through the spring 61. Accordingly, spring 61 will provide additional cushioning action between the sets of wheels and means may be provided to effect adjustment of the force of the spring and thereby affect the cushioning action provided.

Figure 12 illustrates another embodiment wherein a set of castering wheels are used in combination with a full trailer having a set of fixed, conventionally mounted wheels 62. The conventionally mounted wheels 62 are positioned adjacent the rear of the trailer while the castering wheels embodying my invention are spaced from the wheels 62 and are positioned at the front of the trailer. A suitable draw bar is connected, by a horizontal pivot, to the frame of the trailer and may be secured to a towing vehicle in any conventional manner.

The left-hand, castering set of wheels is similar in all respects to the left-hand set of wheels shown in Figures 4, 5 and 6. Accordingly, like parts are identified with like reference numbers but with the suffix "a" added.

The sets of wheels shown in Figure 12 are not connected together for equalizing action since such action is unnecessary in a full trailer. In this embodiment, the pull rod 56a (similar in all respects to rod 56 illustrated in Figure 11) connects the castering set of wheels to a cross-member 63 provided by the frame of the trailer.

Operation of the embodiment of my invention shown in Figure 12 is similar to that shown in Figures 4, 5 and 6. However, movement of the left-hand set of wheels is cushioned by the spring in rod 56a instead of being transferred to the right-hand set of wheels. Operation of the embodiment shown in Figure 12 in turning a corner is also similar to that described heretofore; however, since the pull rod 56a is connected to the frame, only the left-hand set of wheels will raise the body of the trailer. It is to be noted that the weight of the trailer will stabilize the left-hand set of wheels in the same manner as was described with respect to Figures 4, 5 and 6. If desired, a locking device similar to that shown in Figure 10 may be employed to lock the left-hand set of wheels in straight-ahead position when the trailer is moved rearwardly.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Running gear for a vehicle, comprising two sets of running wheels spaced-apart longitudinally of said vehicle and each set including a pair of wheels in axially spaced-apart relation, means securing said wheels to the frame or like portion of said vehicle for movement transversely of their axes thereby providing for variable vertical spacing therebetween, connecting means translating the movement in one direction of one wheel of each set of wheels to movement in the same direction of the other wheel of that set of wheels, means securing one of said sets of wheels to said vehicle for pivotal movement about a substantially vertical axis, lever means connected to the connecting means of said one set of wheels and shiftable therewith about its vertical axis, and means connecting said lever means with the connecting means of said other set of wheels for translating the movement in one direction of either set of wheels to movement in the opposite direction of the opposite set of wheels and for increasing the vertical spacing between said wheels and said vehicle when said one set of wheels is pivoted about its vertical axis.

2. Running gear for a vehicle, comprising two sets of running wheels spaced-apart longitudinally of said vehicle and each including a pair of wheels in axially spaced-apart relation, a rocker shaft supporting each of said sets of wheels for movement transversely of their axes thereby providing for variable vertical spacing between said wheels and said vehicle, each shaft being secured to the frame or like portion of said vehicle for pivotal movement about its longitudinal axis and each being spaced apart from the rotational axis of its related set of wheels, means securing one of said rocker shafts to said vehicle for pivotal movement about a substantially vertical axis, lever means for each of said rocker shafts and each movable with its respective shaft, one of said lever means being secured to said one rocker shaft and having a portion spaced from said vertical axis and shiftable thereabout and the other of said lever means being secured to said other rocker shaft, and means connecting said portion of said one lever means to said other lever means for translating the movement in one direction of either set of wheels to movement in the opposite direction of the opposite set of wheels and for increasing the vertical spacing between said wheels and said vehicle when said one rocker shaft is pivoted about its vertical axis.

3. Running gear for a vehicle, comprising two sets of running wheels spaced apart longitudinally of said vehicle and each including a pair of wheels in axially spaced-apart relation, a torsionally yieldable rocker shaft supporting each of said sets of wheels for movement transversely of their axes thereby providing for variable vertical spacing between said wheels and said vehicle, each shaft being secured to the frame or like portion of said vehicle for pivotal movement about its longitudinal axis and each being spaced apart from the rotational axis of its related set of wheels, means securing one of said rocker shafts to said vehicle for pivotal movement about a substantially vertical axis, lever means fixedly secured to each of said torsionally yieldable rocker shafts, one of said lever means being secured to said one rocker shaft and having a portion spaced from said vertical axis and shiftable thereabout and the other of said lever means being secured to said other rocker shaft, and means connecting said portion of said one lever means to said other lever means for translating the movement in one direction of either set of wheels to movement in the opposite direction of the opposite set of wheels and for increasing the vertical spacing between said wheels and said vehicle when said one rocker shaft is pivoted about its vertical axis.

4. Running gear for a vehicle, comprising two sets of running wheels spaced apart longitudinally of said vehicle and each including a pair of wheels in axially spaced-apart relation, a rocker shaft supporting each of said sets of wheels for movement transversely of their axes thereby providing for variable vertical spacing between said wheels and said vehicle, each shaft being secured to the frame or like portion of said vehicle for pivotal movement about its longitudinal axis and each being spaced apart from the rotational axis of its related set of wheels, means securing each of said rocker shafts to said vehicle for pivotal movement about a respective substantially vertical axis, means selectively operable to lock at least one of said rocker shafts against rotation about its respective said vertical axis, a lever fixedly secured to each of said rocker shafts, each lever having a portion spaced from a respective said vertical axis and shiftable thereabout with its respective rocker shaft, and means connecting said portions of said levers together for translating the movement in one direction of either set of wheels to movement in the opposite direction of the opposite set of wheels and for increasing the vertical spacing between said wheels and said vehicle when either of said rocker shafts is pivoted about its respective said vertical axis.

5. A shock-absorbing suspension between the bed of a vehicle and a pair of wheels at opposite sides of the bed, comprising crank means underlying the vehicle bed and extending between and connecting said wheels, said crank means having an intermediate portion and crank-like end portions rigidly connected to and extending transversely of said intermediate portion and supporting respective wheels for rotation along a road surface, said crank means including vertical pivot means providing for steering movement of said wheels, said intermediate portion extending cross-wise of and being journaled to said bed to provide a common horizontal axis about which both crank-like end portions and their connected wheels may swing in an upright arc, said means yieldably maintaining said crank-like end portions in downwardly inclined relation intermediate horizontal and vertical positions, whereby both crank-like end portions will swing upwardly in said upright arc toward horizontal relation when either wheel strikes a road.

6. A shock-absorbing suspension between the bed of a vehicle and a pair of wheels at opposite sides of the bed, comprising crank means underlying the vehicle bed and extending between and connecting said wheels, said crank means having an intermediate portion and crank-like end portions rigidly connected to and extending transversely of said intermediate portion and supporting respective wheels for rotation along a road surface, said intermediate portion extending cross-wise of and being journalled to said bed to provide a common horizontal axis about which both crank-like end portions and their connected wheels may swing in an upright arc, vertical pivot means between said intermediate portion and said bed to provide for swinging movement of said crank-like end portions in a horizontal arc for the purpose of steering the vehicle, and means yieldably maintaining said crank-like end portions in operation position.

7. A shock-absorbing suspension between the bed of a vehicle and a pair of wheels at opposite sides of the bed, comprising crank means underlying the vehicle bed and extending between and connecting said wheels, said crank means having an intermediate portion and crank-like end portions rigidly connected to and extending transversely of said intermediate portion and supporting respective wheels for rotation along a road surface, said intermediate portion extending cross-wise of and being journalled to said bed to provide a common horizontal axis about which both crank-like end portions and their connected wheels may swing in an upright arc, vertical pivot means between said intermediate portion and said bed to provide for swinging movement of said crank-like end portions in a horizontal arc for the purpose of steering the vehicle, means carried by said bed and providing a horizontal positioned guide surface overlying said crank means, and means carried by said crank means on opposite sides of said vertical pivot means and slidably engageable with said guide surface to support said crank means against deflection caused by road shock and vehicle load.

8. A shock-absorbing suspension between the bed of a vehicle and the wheels of the vehicle which are disposed in spaced pairs, the wheels in each pair being located at opposite sides of the bed, comprising a pair of spaced crank means underlying the bed, each connecting a pair of wheels and each having an intermediate portion and crank-like end portions rigidly connected to and extending transversely of said intermediate portion and supporting respective wheels of the connected pair for rotation along a road surface, each of said crank means including vertical pivot means providing for steering movement of said vehicle, means for selectively locking at least one set of wheels against steering movement, the intermediate portion of each crank means extending cross-wise of and being journalled to said bed and each provides a common axis about which its crank-like end portions and the connected wheels may swing in an upright arc, and means connecting said crank means and yieldably maintaining the crank-like end portions of each in a predetermined relation.

9. In a vehicle having two pairs of road-engaging wheels spaced longitudinally thereof, the wheels of each pair being axle supported and located on opposite sides of the vehicle, a crank for each pair of wheels comprising an intermediate portion pivotally carried transversely of and by said vehicle for rotation about a horizontal axis, each intermediate portion having opposite end portions extending radially therefrom and connected to the axle of the wheels in a respective pair whereby when the wheels of such pair strike a road abutment the intermediate portion of the respective crank is caused to rotate, an arm extending radially of the intermediate portion of each crank and rotatable therewith, a link extending between and connected to said arms for rotating one arm in the same direction that the other arm is rotated by its respective crank, the connection between said arms and said link being of the one-way force transmitting type and so arranged to transmit a pulling force only from one arm to said link and from said link to the other arm.

References Cited in the file of this patent

UNITED STATES PATENTS

| 1,069,334 | Humphrey | Aug. 5, 1913 |
| 1,427,081 | Williams | Aug. 22, 1922 |
| 1,706,195 | Summy | Mar. 19, 1929 |
| 1,894,776 | Liang | Jan. 17, 1933 |
| 1,928,545 | Rondier | Sept. 26, 1933 |
| 1,930,208 | Marcum | Oct. 10, 1933 |
| 2,404,121 | Black | July 16, 1946 |
| 2,567,481 | Hickman | Sept. 11, 1951 |

FOREIGN PATENTS

| 608,558 | France | Apr. 24, 1926 |
| 969,106 | France | Dec. 14, 1950 |
| 989,417 | France | Sept. 10, 1951 |
| 993,263 | France | Oct. 29, 1951 |